United States Patent [19]

de Mars et al.

[11] Patent Number: 5,320,851
[45] Date of Patent: Jun. 14, 1994

[54] PACKAGING AND DISPENSING SYSTEM FOR FLUID AND SEMI-FLUID CEMENT ADMIXTURES

[75] Inventors: John O. de Mars, Wilmington; Kevin W. Grogan, Salem, both of Mass.; Eliot Kay, Moorestown; Stephen P. Belko, Blackwood, both of N.J.

[73] Assignee: W.R. Grace & Co.-Conn., New York, N.Y.

[21] Appl. No.: 829,991

[22] Filed: Jan. 31, 1992

[51] Int. Cl.⁵ .................. A61K 9/48; A61K 9/64; E04H 14/00
[52] U.S. Cl. ..................... 424/451; 424/452; 424/456
[58] Field of Search ............ 424/451, 452, 456; 52/175 R

[56] References Cited

U.S. PATENT DOCUMENTS

| | | | |
|---|---|---|---|
| 3,431,166 | 3/1969 | Mizutani | 162/135 |
| 3,859,125 | 1/1975 | Miller et al. | 117/155 |
| 4,210,009 | 7/1980 | Farfor et al. | 72/186 |
| 4,344,266 | 8/1982 | Gray | 52/742 |
| 4,426,458 | 1/1984 | Woodhams | 501/140 |
| 4,518,725 | 5/1985 | Guicquero | 524/3 |
| 4,555,354 | 11/1985 | Clarke et al. | 252/90 |
| 4,657,593 | 4/1987 | Aignesberger et al. | 106/90 |
| 4,665,109 | 5/1987 | Sperling et al. | 523/206 |
| 4,747,240 | 5/1988 | Voisinet et al. | 52/173 R |
| 4,814,014 | 3/1989 | Arfaei | 106/90 |
| 4,961,790 | 10/1990 | Smith et al. | 106/823 |

OTHER PUBLICATIONS

"Fine Particle Size Vermiculite"; W. R. Grace & Co.-Conn; Oct., 1989 Trade Sheet.
Kirk–Othmer, 3rd Ed. (1981) vol. 16, p. 801.
W. R. Grace & Co.-Conn., Technical Data Sheet "Grace-Fibers" 1989.
ASTM C 1116-89 "Standard Specification for Fiber-Reinforced Concrete and Shotcrete".

*Primary Examiner*—Nathan M. Nutter
*Attorney, Agent, or Firm*—Kevin S. Lemack; John J. Wasatonic; William L. Baker

[57] ABSTRACT

The present invention relates to a packaging and dispensing system especially suitable for semi-fluid or fluid cement admixtures. The admixture is encapsulated in a material, such as gelatin or wax, which ruptures, shatters, or disintegrates in the wet cementitious mixture during a period of mechanical mixing. The present invention also contemplates a method of modifying the properties of cementitious mixtures by adding thereto an encapsulated admixture in a predetermined amount sufficient to provide a modified cementitious composition having the desired properties.

12 Claims, 1 Drawing Sheet

PACKAGING AND DISPENSING SYSTEM FOR FLUID AND SEMI-FLUID CEMENT ADMIXTURES

FIELD OF THE INVENTION

This invention relates to concrete and cement additives useful for various purposes, such as entraining air, and in particular, a packaging system therefore which allows for ease in dispensing and distributing the additives into cementitious compositions.

BACKGROUND OF THE INVENTION

Admixtures are known in the art as materials used as ingredients in cementitious compositions to modify some property or properties of the cementitious compositions before, during or after the cementitious compositions have been formulated. Set retarding agents, accelerators, water reducers, superplasticizers and air-entraining agents are typical admixtures commonly used in the industry.

The successful use of admixtures depends in part upon the amount used for any given batch of cementitious mixture. Excess or insufficient amounts added to the mix may deleteriously affect the properties of the mix, and often result in considerable waste, not only of the admixture proper, but of the improperly dosed mix as well.

Conventional techniques for dispensing semi-fluid admixtures into cementitious compositions generally require extensive apparatus, which is costly, time-consuming and labor-intensive. In addition, use of such apparatus can result in spills, the generation of fumes, and may result in workers physically contracting the admixture, which can be undesirable. Most materials used as admixtures for cementitious mixtures are in aqueous, highly fluid states or in solid or powdered states. Semi-fluid admixture materials that have high viscosity at temperatures of 30°–100° F. are especially difficult to dispense into cementitious mixtures. One mechanism for metering such admixtures is a bulk blending station including bulk tanks, pump motors, electromagnetic meters, calibrated sight vessels, and necessary hoses.

In the case of solid or powdered admixtures, typically the dispensing involves manually introducing loose admixtures into the cementitious mixture by mass or volumetric measurement. Another device involves water-soluble containers that envelop solid or powdered material, and the containers dissolve and release their contents while being blended into the wet cementitious mixture. For example, U.S. Pat. No. 4,961,790 to Smith et al. discloses a device comprising a solid or powdered concrete admixture contained in a water-soluble container. When the container is introduced into a wet mixer and agitated, the water-soluble container is dissolved and the contents are thereby released into the mixer.

However, there is currently no viable packaging and dispensing technique for concrete admixtures that address the problem of dispensing admixtures that are in a semi-fluid or fluid state into cementitious mixtures without the use of extensive apparatus, or without the high probability that admixtures may spill in transit.

SUMMARY OF THE INVENTION

The problems of the prior art have been solved by the instant invention, which provides a packaging and dispensing system for semi-fluid and fluid admixtures. Specifically, the present invention is directed to an encapsulated semi-fluid or fluid admixture, the capsule of which is formed of a material which allows for the emission of the admixture into the wet cementitious mixture when added to the cementitious mixture and subjected to mechanical agitation therein. The capsule may rupture, shatter or disintegrate as a result of the mechanical agitation, exposure to the cementitious mixture, or a combination of the two, with resultant dispensing of the admixture into the cementitious system. The encapsulation material is chosen to be such that it is not deleterious to the desired characteristics of the cementitious mixture.

The present invention also contemplates a method of modifying the properties of a cementitious composition by adding thereto an encapsulated semi-fluid or fluid admixture in a predetermined amount sufficient to provide a modified cementitious composition having the desired properties upon the distribution of the admixture into the cementitious composition.

The packaging and dispensing system and method of the present invention also can be applied to solid admixtures.

DETAILED DESCRIPTION OF THE INVENTION

Figure 1:
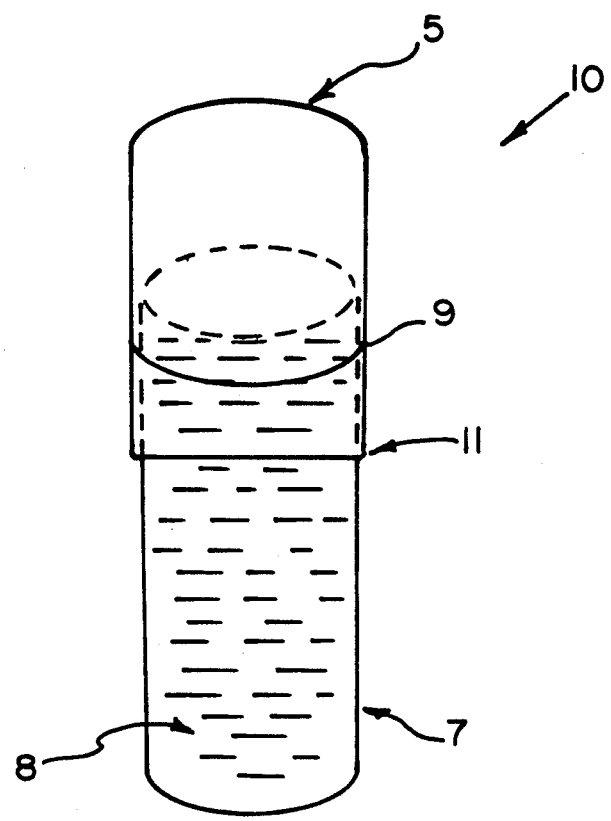
FIG. 1 illustrates an encapsulated semi-fluid admixture in accordance with the present invention.

The various semi-fluid and fluid admixtures that can be used in accordance with the present invention include, but are not limited to, admixtures that entrain air, detrain air, increase workability, retard setting, accelerate setting, inhibit corrosion, etc. Those skilled in the art will recognize the applicability of the instant invention to a plethora of fluid, semi-fluid, or solid admixtures useful for many purposes.

Turning now to FIG. 1, there is shown generally at 10 a closed package such as a capsule having a top 5 and a bottom 7. The package 10 can be formed of a water-soluble material, such as gelatin, or can be formed of glass or polyethylene. Gelatin packaging, such as gelatin capsules in compliance with U.S. Pharmacopeia standards for use and manufacture of empty gelatin capsules, have been found to dissolve appropriately in cementitious compositions aided by mechanical mixing, such as that typical in a ready-mix truck, and is a preferred packaging material. Gelatin has also been found to be not deleterious to the final cementitious compositions formulated. Capsules having the following composition have been found to be suitable:

| Ingredient | Weight % |
|---|---|
| Gelatin | 82.6–81.6 |
| Water | 13–14 |
| Propylene Glycol | 3.33 |
| Methylparaben | 0.75 |
| Propylparaben | 0.08 |
| Sodium Lauryl Sulphate | 0.25 |

Propylene glycol is used as a plasticizer; methylparaben and propylparaben are used as preservatives; and sodium lauryl sulphate is a surfactant. The water used also passes all U.S. Pharmacopeia tests for use in processing and manufacture of empty gelatin capsules.

The package bottom 7 is filled with the semi-fluid or fluid admixture 8 by any suitable means, and is capped with the package top 5. A mechanical seal in the form of an indentation ring can be formed by conventional means in a location where the top 5 and bottom 7 overlap, such as at 9, to secure the package top 5 to the package bottom 7. Alternatively or in addition, an outer bonding seal can be formed at 11 with the use of a suitable adhesive, or with gelatin or wax. Upon the addition of the closed package containing admixture to a cementitious composition under the influence of mechanical agitation, in the case of gelatin the package body tends to swell, fatigue, and eventually rupture to release its contents, which are then uniformly distributed into the cementitious system. Where polyethylene or glass is used as the capsule body, the capsule tends to shatter, thereby emitting the admixture, and eventually disintegrate.

Although gelatin capsules are a preferred type of packaging in view of their availability, cost, and ease of use, in certain cases the gelatin may not be chemically inert to the encapsulated admixture, leading to degradation or premature disintegration of the capsule. In addition, two piece capsules such as gelatin capsules can suffer the disadvantage of leakage of fluid and semi-fluid admixtures at the junction between the top and bottom capsule sections. Although the outer bonding seal mentioned above can often be used to alleviate this problem, the resultant completely sealed capsule cannot vent any internal pressure and, thus, may crack or rupture prematurely. This may be a recurrent problem, especially when the admixture is reactive with the gelatin and the reaction produces gaseous by-products. Accordingly, in another preferred embodiment of this invention, the aforementioned problems are overcome by employing wax capsules in which the wax is chemically inert to the encapsulated contents. The wax capsules are completely sealed, but do not have the tendency of gelatin capsules to crack or rupture. It has been found that the wax capsules satisfactorily dispense the encapsulated admixture under the influence of mechanical agitation, in a manner similar to gelatin, and that the residual wax in the cementitious mix is not deleterious.

The wax capsules can be made by conventional molding techniques, whereby a wax melt is hot molded and an opening is provided for introduction of the admixture into the molded capsule. The admixture is introduced after the wax has cooled. The opening is then sealed with a plug of the same or a different wax, using conventional heat sealing techniques. Preferably, this creates a monolithic, essentially seamless housing for the admixture. Any suitable wax, such as paraffin wax, or mixture of waxes can be used. The wax compositions may include additives to modify the properties of the capsule. For example, polymers such as ethylene vinyl acetate may be added to modify the brittleness or plasticity of the wax. Preferred wax capsules are those having a wall thickness of about 1/16 to ⅜ inch.

In view of the fact that the need for conventional hardware for dispensing fluid or semi-fluid admixtures is alleviated by the present invention, it is now possible to formulate the admixtures in high concentration. An important application of the encapsulated fluid or semi-fluid admixtures of the present invention is in dosing cementitious mixtures in large batch-type mixing vessels such as ready-mix trucks. To that end, the present invention contemplates the use of large capsules to hold admixture amounts sufficient to dose the various amounts of cementitious compositions typically present in such vessels. Capsules typically used in veterinary applications have been found to be suitable. Preferably, the capsules are of such size as to hold at least about 0.5 fluid ounces of admixture, most preferably about 1 fluid ounce of admixture. For entraining air in volumes of 20 to 30% in grout mixtures, about 3 such 1 ounce capsules containing the air-entraining agent are generally necessary to dose about one cubic yard of grout. The capsule can be hand-filled, or can be filled by using conventional apparatus typically used in filling capsules for the pharmaceutical industry.

The capsules of the present invention can be fabricated in any shape, and the only limitation being the fill opening of the vessel in which they are being added. Suitable shapes include bullet, football, etc.

In its method aspects, the present invention provides for the introduction of an encapsulated admixture inside a batch-type cementitious mixer drum via the drum opening. This may be accomplished prior to the introduction of the other components of the cementitious composition, during the introduction of the other components, after the introduction, or any combination of the three. Suitable time should be allowed to allow the capsule to rupture, shatter or disintegrate, as the case may be, and the encapsulated material to enter the system. Suitable time should thereafter be allowed to allow the admixture to uniformly distribute in the cementitious mixture.

In order that the invention be better understood, it will now be described with reference to the following examples.

EXAMPLE 1

Air Entrainment for Controlled Low Strength Material

Material for air entrainment such as a fatty acid ester having a viscosity index of 390 at 100° F. is placed in gelatin capsules such as those supplied to Torpac, Inc. (New York, N.Y.). The capsules are in two parts with one mechanically inter-locking with the other to provide a seal therebetween. The admixture is added to a first part of the capsule and the other part is placed over the first part to encapsulate the admixture therein. An additional seal comprised of gelatin, wax, or an adhesive binds the tops covering half edge to the outside wall of the bottom inserted half. (Capsules containing the admixture should be stored between 40 and 80° F. in 20 to 50% relative humidity).

The capsules are added to a cementitious mixture such as in a ready-mix truck, and the mixing process is continued for a period of time necessary to ensure that the admixture enters the cementitious system. Longer periods of time are necessary for smaller size mixtures, or when the mixer is of low power. The capsules swell and fatigue during the mixing process, and eventually rupture and disintegrate, thus allowing the admixture to disperse and function in the intended fashion.

EXAMPLE 2

A two piece, egg-shaped metal mold, measuring about 3⅜ inches high and 2⅛ inches wide, was filled through an opening at one end of the mold with a wax melt composition containing 75% by weight of 143-145 paraffin wax, 12.5% by weight of 155 white microwax, and 12.5% by weight of ethylene vinyl acetate. The filled mold was allowed to stand at room temperature for a time sufficient to solidify the wax at the periphery of the melt (about 10 minutes), and the remaining wax melt was then poured out of the mold. Three fluid ounces of a fatty acid ester air-entraining admixture were then dispensed into the mold through the opening, filling the molded wax capsule. An additional amount of the wax melt was then floated onto the admixture, filling the opening at the top of the wax capsule, cooled to form an essentially seamless closure, and the metal mold was then broken apart and removed. The average wall thickness of the wax capsule was about ¼ inch.

When added to a cement slurry in a rotating mixer, the capsule ruptured and released the air entrainer into the slurry.

We claim:

1. An encapsulated semi-fluid of fluid admixture of modifying one or more properties of a cementitious composition, comprising a capsule body formed of wax that allows for the emission of said admixture into a cementitious mixture when placed in said mixture and subjected to mechanical agitation therein, and a semi-fluid or fluid admixture contained within said capsule body.

2. The encapsulated admixture of claim 1, wherein said capsule body comprises a capsule top and a capsule bottom mechanically sealed to one another.

3. The encapsulated admixture of claim 1, wherein said capsule body is essentially seamless.

4. The encapsulated admixture of claim 1 wherein said capsule body has a wall thickness of about 1/16 to ⅜ inch.

5. The encapsulated admixture of claim 1, wherein said emission of said admixture is caused by the rupturing, shattering or disintegration of said capsule body.

6. The encapsulated admixture of claim 1, wherein said admixture comprises a fatty acid ester air-entraining agent.

7. A method of dispensing a semi-fluid or fluid admixture into a cementitious composition, comprising forming a capsule body of wax, introducing said admixture into said wax capsule body, introducing said capsule body into said cementitious composition and providing sufficient agitation to cause the emission of said admixture from said capsule body and into said cementitious composition.

8. The method of claim 7, wherein said housing comprises a wax which is inert to said admixture.

9. The method of claim 8, wherein said housing has a wall thickness of about 1/16 to ⅜ inch.

10. The method of claim 7, wherein said admixture is a fatty acid ester air-entraining agent.

11. The method of claim 7, wherein said housing ruptures, shatters or disintegrates during said agitation.

12. The method of claim 8, wherein said housing is essentially seamless.

* * * * *